United States Patent [19]
Roman

[11] Patent Number: 5,868,992
[45] Date of Patent: Feb. 9, 1999

[54] TREATMENT OF GAS SEPARATION MEMBRANES WITH INERT SOLVENT

[75] Inventor: Ian Charles Roman, Wilmington, Del.

[73] Assignee: L'Air Liquide, S.A., Paris, France

[21] Appl. No.: 467,507

[22] Filed: Jun. 6, 1995

Related U.S. Application Data

[63] Continuation of Ser. No. 138,310, Oct. 20, 1993, abandoned.

[51] Int. Cl.$^6$ .............................. B01D 67/00; B01D 71/06
[52] U.S. Cl. ........................ 264/340; 427/230; 427/430.1; 95/45; 96/4; 428/304.4
[58] Field of Search .............................. 428/304.4, 310.5, 428/313.5, 376, 392, 411.1, 421, 422; 96/4, 10, 11, 12; 95/45, 54; 210/500.21, 500.22, 500.23; 427/230, 430.1, 444, 445; 264/340

[56] References Cited

U.S. PATENT DOCUMENTS

| | | | |
|---|---|---|---|
| 4,230,463 | 10/1980 | Henis et al. ................................. | 55/16 |
| 4,415,608 | 11/1983 | Epperson et al. ........................ | 427/244 |
| 4,504,228 | 3/1985 | Maetani et al. .......................... | 433/199 |
| 4,527,999 | 7/1985 | Lee .............................................. | 55/16 |
| 4,767,422 | 8/1988 | Bikson et al. .............................. | 55/16 |
| 4,776,936 | 10/1988 | Smith et al. ....................... | 204/157.15 |
| 4,784,880 | 11/1988 | Coplan et al. ........................... | 427/245 |
| 4,881,954 | 11/1989 | Bikson et al. .............................. | 55/16 |
| 4,906,377 | 3/1990 | Yen et al. ........................... | 210/500.42 |
| 4,976,897 | 12/1990 | Callahan et al. .......................... | 264/22 |
| 5,032,149 | 7/1991 | Hayes ......................................... | 55/16 |
| 5,049,167 | 9/1991 | Castro et al. ............................... | 55/16 |
| 5,051,113 | 9/1991 | Nemser ...................................... | 55/16 |
| 5,051,114 | 9/1991 | Nemser et al. ............................. | 55/16 |
| 5,053,059 | 10/1991 | Nemser ...................................... | 55/16 |
| 5,131,927 | 7/1992 | Bikson et al. .............................. | 55/16 |
| 5,160,353 | 11/1992 | Gochanour ................................ | 55/158 |
| 5,178,940 | 1/1993 | Matsumoto et al. ................. | 428/304.4 |
| 5,238,471 | 8/1993 | Blanchet-Fincher ........................ | 96/13 |

FOREIGN PATENT DOCUMENTS

| | | |
|---|---|---|
| 0 141 793 A1 | 5/1985 | European Pat. Off. . |
| 0179474 | 4/1986 | European Pat. Off. . |
| 0 422 884 A1 | 4/1991 | European Pat. Off. . |
| 0 424 004 A1 | 4/1991 | European Pat. Off. . |
| 49-078681 | 7/1974 | Japan . |
| 1039295 | 8/1966 | United Kingdom . |
| 2229728 | 10/1990 | United Kingdom . |
| 9015662 | 12/1990 | WIPO . |
| WO 92/09353 | 6/1992 | WIPO . |

*Primary Examiner*—Marie Yamnitzky
*Attorney, Agent, or Firm*—Linda K. Russell

[57] ABSTRACT

A process for improving the permselectivity of polymeric gas separation membranes is disclosed. The process involves contacting the membrane with a fluorocarbon, such as fluorinated ethers, perferably perfluorinated compounds, or a solution of a fluorocarbon and a caulking agent.

7 Claims, No Drawings

TREATMENT OF GAS SEPARATION MEMBRANES WITH INERT SOLVENT

This is a continuation of application Ser. No. 08/138,310 filed Oct. 20, 1993, now abandoned.

FIELD OF THE INVENTION

The present invention relates to polymeric gas separation membranes and a treatment for such membranes to improve their permselectivity with respect to at least one pair of gases in a multicomponent gas mixture. The treatment involves applying a fluorinated solvent, preferably a perfluorinated solvent, to the gas separation membrane. The fluorinated solvent is capable of improving the permeation performance of the polymeric gas separation membrane without significantly changing or damaging the membrane morphology. In addition, the fluorinated solvent is a vehicle for delivering a caulking or sealing agent to the surface of the membrane.

PRIOR ART

U.S. Pat. No. 4,472,175 and U.S. Pat. No. 4,654,055 disclose asymmetric gas separation membranes which have been treated on one or both surfaces with a Bronsted-Lowry acid or base, respectively, to improve the permeation selectivity of the membrane for at least one gas of a gaseous mixture.

U.S. Pat. No. 4,554,076 discloses a method for improving the separatory properties of membranes by depositing on the surface of such membrane a fluorinated amphiphilic compound in an oriented Langmuir-Blodgett layer to increase membrane selectivity. The patent is primarily directed to liquid-liquid separations, but gases are mentioned.

Robb, in U.S. Pat. No. 3,325,330, teaches that a multicomponent gas membrane prepared from two dense separating layers laminated together is unlikely to have defects because defects in one dense layer are probably not going to align with defects in the other. Browall et al., in U.S. Pat. Nos. 3,874,986 and 3,980,456, extend these teachings to include multicomponent gas membranes comprising a laminate between an asymmetric membrane and a dense film. These teachings have been further extended to include multicomponent gas membranes prepared by coating an asymmetric membrane with a solution which upon drying and curing forms a dense polymeric layer (U.S. Pat. No. 4,230,463).

U.S. Pat. No. 5,032,149 teaches a process for improving a polyaramide gas separation membrane by swelling it with a dilute solution of a surfactant in a solvent.

EPO-0,179,474 discloses treating various polymeric gas separation membranes with a dilute solution of a cationic surfactant in a volatile nonpolar organic solvent to improve the selectivity of the membrane with respect to separating two gases selected from $CO_2$, $CH_4$ and He.

Such prior art posttreatments may provide gas separation membranes which exhibit improved selectivity; however, unless the solvent is highly inert toward the membrane polymer the treating solution may also cause or induce change or damage to the morphology of the membrane, which may cause loss of trans-membrane flux. Therefore, a posttreatment is needed which improves selectivity but does not change or damage the membrane. In addition, gas separation membranes desirably have a high permeability to gases. This means that the effective portion of the membrane should be as thin as possible. Making the membrane as thin as possible necessarily leads to the membrane containing imperfections or defects. These defects pass gases indiscriminately thus reducing the selectivity of the membrane. In the past, these membrane defects have been sealed or reduced to improve gas separations membrane performance.

One method for preparing membranes for gas separations from membranes containing pores has been to treat at least one surface of the membrane containing the pores to densify the surface and thereby decrease the presence of pores, which pores decrease the effective selectivity of separation of the membrane. This densification has been by, for instance, chemical treatment with solvents or swelling agents for the material of the membrane or by annealing which can be conducted with or without the contact of a liquid with the membrane. Such densification procedures usually result in a disadvantageous decrease in flux through the membrane. The swelling agent may comprise a single component or a multicomponent mixture, such as solvent-nonsolvent mixtures. It is believed that the outer layers of the swollen membrane compact upon drying to yield the observed improvement to the membrane selectivity. Recent examples of such processes are described in U.S. Pat. Nos. 4,486,376; 4,512,893; 4,512,894; 4,527,999; and 4,715,960. Membrane materials may vary greatly in their intrinsic parameters. What may constitute a swelling agent for one material may be a solvent or an inert substance to another material. Further, certain swelling agents may be effective only for specific polymers or for certain types of defects.

Therefore, the posttreatment must heal or seal defects in the thin dense separating layer of the membrane. The posttreated membrane should be capable of separating a gaseous component from at least one other gaseous component in a gas mixture; it should possess high gas selectivity, high recovery, adequate gas permeability, and preferably the ability to operate under conditions of high temperature and/or pressure.

SUMMARY OF THE INVENTION

The present invention is a process for healing defects or imperfections in the thin dense separating layer of the membrane to provide a polymeric membrane having improved permselectivity with respect to at least one gas in a gaseous mixture by treatment of the membrane with (a) a fluorinated solvent or (b) a solution of a fluorocarbon and a caulking or healing agent. The fluorinated compound is preferably perfluorinated.

DETAILED DESCRIPTION OF THE INVENTION

Many commercial polymeric gas separation membranes are asymmetric in nature. They are made by casting a film or extruding a hollow fiber from a solution of a polymer in a solvent mixture, evaporating a portion of the solvent from one side of the film or the outside of the hollow fiber and quenching in a nonsolvent. The resulting asymmetric membrane is characterized by a thin skin of polymer supported by a generally cellular structure. This provides a membrane having a thin effective separation member, which results in a high flux or permeation rate to gases, which is highly desirable. However, this effort to form a highly permeable membrane also leads to the formation of submicroscopic defects or imperfections which pass gases indiscriminately causing the membrane to have an effective separation value for most pairs of gases which is less than the intrinsic separation value of the polymer from which the membrane is made. The separating layer of a composite membrane may also have such defects or imperfections.

The range of defects (size and number) which protrude through the dense separating layer of a membrane can be estimated by the selectivity of one gas over another gas for at least one pair of gases permeating through the membrane. The intrinsic separation factor for a material and the separation factor for a membrane prepared from that material can be compared to determine range of defects. Generally, the observed selectivity ratio of the membranes treated in accordance with the present invention will be substantially enhanced.

To obtain the intrinsic gas selectivity of a membrane, a perfect, defect-free, dense separating layer must be formed during the membrane formation process. The integrity of this separating layer must be maintained throughout the gas separation module to retain a high gas membrane selectivity. This idealized membrane separating layer which is substantially free of defects could be prepared by increasing the thickness of the layer. In so doing, defects would not be able to protrude through the separating layer. However, this results in a reduction of the gas permeation rate through the membrane, which is not desirable.

The present invention circumvents the above shortcomings and provides high performance gas separation membranes.

The intimate mechanistic details of this procedure are not well understood. They may vary for different material compositions. It is believed that the perfluorinated solvents described herein are inert toward the membrane polymer and therefore do not cause significant solvent-induced morphology change or damage, thereby shrinkage or collapse of the membrane's pores. It is clear that the procedure reduces the effects that membrane defects and imperfections have on the gas-pair selectivity.

It is believed that the amount of change or damage to the membrane morphology is related to the ability of the liquid to plasticize the polymer, a crude measure of which is the affinity of the liquid for the polymer. It is also related, although to a lesser extent, to the liquid's surface tension; low surface tension means less energy is required to strip the liquid from the small pores, which also reduces solvent-induced damage to the membrane morphology.

Thus, desirable posttreatment solvents preferably have a low solubility for the membrane material (roughly quantifiable by a solubility parameter below 7.2) and a low surface tension ($\leq 18$ dynes/cm). These requirements are met almost exclusively by fluorinated liquids, especially perfluorinated or quasi-perfluorinated liquids.

The perfluorinated solvent serves to effectively heal or seal a broad variety of membrane types which incorporate a wide distribution of pore and defect sizes. The membrane treated by the process of this invention does not suffer from membrane change or damage which may prevent the membranes from achieving their upper limit of performance.

In addition, perfluorinated solvents furnish other advantages for the posttreatment of membranes:

The boiling points are far lower than might be expected based on the molecular weight, thus allowing facile removal of the solvent from the membrane.

The low surface tension of the fluorocarbons ensures fast and thorough wetting of the membrane, thereby minimizing the risk of pockets of trapped air when treating hollow-fiber membranes.

The fluorocarbons are virtual nonsolvents for most materials of membrane permeator construction; this allows in-situ treatment of membranes built into membrane permeators.

Because the effect of the fluorocarbons on the membrane morphology is very small, the effects of the fluorocarbon may be readily controlled by manipulating the contact time, temperature and number of contacts with the membrane.

The membrane may be conditioned with the application of a fluorocarbon to allow better adhesion of a coating or caulking material in a second posttreatment step.

The process of the present invention generally entails contacting a gas separation membrane with a perfluorinated solvent followed by drying. The fluorocarbon may be alone or in a solution with a caulking agent such as a dipolymer of perfluoro-2,2-dimethyl-1,3-dioxole and tetrafluoroethylene. Any suitable method may be employed to apply the solvent to the membrane; for example by spraying, brushing, immersion or the like. Advantageously, the solvent may be applied to one surface of the porous separation membrane, and the other side of the porous separation membrane is subjected to a lower absolute pressure. The invention itself is not limited by the particular method by which the solvent is applied. The gas separation membrane healing technology of the present invention is particularly useful for aromatic polyimide membranes. The procedure of the present invention will find utility for many membrane morphologies, such as asymmetric or composite membranes, particularly asymmetric.

The polymeric membranes for gas separation, according to the invention, can be films or hollow filaments, or fibers, having a thin separating layer, and a coating in contact with the thin separating layer. Some factors which influence the behavior of the multicomponent membranes are the permeability constants of the materials of the sealing agent or coating, and the thin separating layer, the total cross-sectional area of the holes (i.e., pores or flow channels) in the thin separating layer relative to the total surface area of the thin separating layer, the relative thickness of each of the coating and the thin separating layer of the multicomponent membrane, the morphology of the thin separating layer, and most importantly the relative resistance to permeant flow of each of the coating and the thin separating layer in a multicomponent membrane. In general, the degree of separation of the membrane is influenced by the relative resistance to gas flow for each gas in the gas mixture of the coating and the thin separating layer, which can be specifically chosen for their gas flow resistance properties.

The polymer used for the separation membrane may be addition or condensation polymers which can be cast, extruded or otherwise fabricated to provide separation membranes. The separation membranes can be prepared in asymmetric form, for example, by casting from a solution comprised of a good solvent for the polymeric material into a poor or nonsolvent for the material. The spinning and/or casting conditions and/or treatments subsequent to the initial formation, and the like, can influence the porosity and resistance to gas flow of the separation membrane.

Typical polymers suitable for the separation membrane according to the invention can be substituted or unsubstituted polymers and may be selected from polysulfones; poly(styrenes), including styrene-containing copolymers such as acrylonitrile-styrene copolymers, styrene-butadiene copolymers and styrene-vinylbenzylhalide copolymers; polycarbonates; cellulosic polymers, such as cellulose acetate-butyrate, cellulose propionate, ethyl cellulose, methyl cellulose, nitrocellulose, etc.; polyamides and polyimides, including aryl polyamides and aryl polyimides; polyethers; poly(arylene oxides) such as poly(phenylene oxide) and poly(xylene oxide); poly(esteramide-diisocyanate); polyurethanes; polyesters (including polyarylates), such as poly(ethylene terephthalate), poly(alkyl methacrylates), poly(acrylates), poly(phenylene terephthalate), etc.; polysulfides; polymers from monomers having alphaolefinic unsaturation other than mentioned above such as poly(ethylene), poly(propylene), poly(butene-1), poly(4-methyl pentene-1); polyvinyls, e.g., poly(vinyl chloride), poly(vinyl fluoride), poly(vinylidene chloride), poly(vinylidene fluoride), poly(vinyl alcohol); poly(vinyl esters) such as poly(vinyl acetate) and poly(vinyl propionate), poly(vinyl pyridines), poly(vinyl pyrrolidones), poly(vinyl ethers), poly(vinyl ketones); poly(vinyl aldehydes) such as poly(vinyl formal) and poly(vinyl butyral), poly(vinyl amides), poly(vinyl amines), poly(vinyl urethanes), poly(vinyl ureas), poly(vinyl phosphates), and poly(vinyl sulfates); polyallys; poly(benzobenzimidazole); polyhydrazides; polyoxadiazoles; polytriazoles; poly (benzimidazole); polycarbodiimides; polyphosphazines; etc., and interpolymers, including block interpolymers containing repeating units from the above such as terpolymers of acrylonitrile-vinyl bromide-sodium salt of para-sulfophenylmethallyl ethers; and grafts and blends containing any of the foregoing. Typical substituents providing substituted polymers include halogens such as fluorine, chlorine and bromine; hydroxyl groups; lower alkyl groups; lower alkoxy groups; monocyclid aryl; lower acyl groups and the like. Generally, polymers can be mixed with inorganics to prepare the porous separation membrane.

The inventive posttreatment is particularly useful for polymer membranes which are highly susceptible to solvent-induced damage.

The membranes may be fabricated in various geometrical configurations, such as sheet formed membranes and hollow fibers. The membranes may be symmetrical, asymmetrical, single component or composite. The polymeric substrate membrane is preferably in the form of a hollow fiber having an outside diameter of about 75 to 1,000 microns, and preferably 90 to 350 microns, and a wall thickness of about 20 to 300 microns. Preferably the diameter of the bore of the fiber is about one quarter to three quarters the outside diameter of the fiber. The preferred aromatic polyimide membranes are porous with the average cross-sectional diameter of the pores varying within the range of 5 to 20,000 angstroms. The pore sizes are greater in the interior of the membrane and lesser near the surfaces of the membrane, such that the membrane is anisotropic or asymmetric. The porosity of the membrane is sufficient that the void volume of the membrane is within the range of 10 to 90, preferably about 30 to 70 percent based on the superficial volume; i.e., the volume contained within the gross dimensions of the porous separation membrane.

The compounds useful herein as solvent are fluorinated, with either all the hydrogen atoms on each carbon atom replaced by fluorine atoms (perfluorinated) or all but one of the hydrogen atoms on each carbon atom replaced by fluorine. The compounds include, without limitation, fluorinated ethers, fluorinated alkanes and cycloalkanes, perfluorotrialkylamines, and perfluorinated aromatic compounds.

Perfluorinated cycloalkanes are saturated cyclic compounds, which may contain fused or unfused rings. The cycloalkane compounds may be substituted by perfluoroalkyl and perfluoroalkylene groups. Perfluoroalkyl groups are a saturated branched or linear carbon chain. Perfluoroalkylene groups are an alkylene group which is branched or linear and connects two different carbocyclic rings. The total number of carbon atoms in all of the perfluoroalkyl and perfluoroalkylene groups in a molecule of the solvent are preferably less than the total number of carbon atoms in the carbocyclic rings of the solvent molecule. It is preferred if there are at least twice as many carbon atoms in the rings of the solvent molecule as there are atoms in the perfluoroalkyl and perfluoroalkylene groups. Perfluorinated aromatic compounds are similar to perfluorocyclic alkanes, provided that one or more of the constituents is a phenyl group. The perfluorinated aromatic compounds may also be substituted with perfluoroalkyl groups or perfluoroalkylene groups. Perfluorotrialkyl amines include, for example, perfluorotrihexyl amine perfluorotriethylamine, perfluorotripropylamine, perfluorotributylamine and perfluorotrihexylamine.

Compounds also useful as solvents herein include fluorinated ethers of the FREON® E series (structure below); perfluorotetrahydrofuran and perfluorinated substituted tetrahydrofurans such as perfluoro propyltetrahydrofuran and perfluoro butyltetrahydrofuran; fluorinated alkanes and cycloalkanes, including perfluoro n-hexane, perfluoro n-heptane, perfluoro n-octane, 1-hydroperfluorohexane, 1-hydroperfluoroheptane, perfluorocyclohexane, perfluoromethylcyclohexane, perfluoro-1,3-dimethylcyclohexane; perfluorobenzene, perfluorodecalin and perfluorotetradecahydrophenanthrene. Preferred compounds are FREON® E1 and FREON® E2; 1,1,2,2,3,4-hexafluoro-3,4-bis(trifluoromethyl)cyclobutane and 1,1,2,3,3,4-hexafluoro-2,4-bis(trifluoromethyl)cyclobutane; perfluorotetrahydrofuran and perfluorobutyltetrahydrofuran; perfluoro n-hexane and perfluoro n-heptane.

The chemical structure of the FREON® E series is:

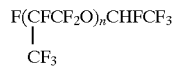

where the E number is equal to n.

In the preferred embodiment of the present invention, a gas separation membrane is contacted with a fluorinated solvent or a solution based on a fluorinated solvent. The membrane is then dried.

The perfluorinated solvent may be mixed with a swelling agent for the membrane material. Such a swelling agent may be composed of a single component or be a multicomponent mixture incorporating noninteracting substances and/or solvents for the membrane material. Specific perfluorinated solvents will be dependent on the parameters of the membrane material and the membrane morphology.

Caulking agents which may be dissolved or dispersed in the fluorocarbon are known in the art and include, but are not limited to, amorphous fluoropolymers such as perfluoro-2,2-dimethyl-1,3-dioxole, copolymers of perfluoro-2,2-dimethyl-1,3-dioxole and at least one of tetrafluoroethylene, perfluoromethyl vinyl ether, vinylidene fluoride; chlorotrifluoroethylene; and perfluoroalkyl methacrylates. They also include fluorosurfactants and some simple large involatile organics, such as dioctyl phthalate.

In practical terms, the fluorinated solvent modifies the membrane's gas permeation properties through contact. Preferably, membrane treatment with a perfluorinated solvent as described herein gives at least a 5% improvement in the selectivity of a fast gas over a slow gas. Practical examples include $O_2$ over $N_2$, one of $H_2$, He or CO over $N_2$, CO, methane or ethane. More preferably, the selectivity enhancement is 10% or greater.

The perfluorinated solvent may contain an effective surfactant, for example 0.005 to 1.0 weight percent of a surfactant. Surfactants effective in the herein-described procedure may include anionic, neutral nonionic or amphoteric types. They may be aliphatic, aromatic or fluorinated. The fluoroaliphatic polymeric esters are particularly useful. These surfactants generally contain from 6 to 50 carbon atoms. The surfactants are to be incorporated in an effective amount. This effective amount will vary broadly based on the chemical nature of the surfactant, on the nature of the fluorinated solvent, on the chemical nature of the membrane material, and on the morphology of the membrane to be treated.

The pressure normalized flux or permeance of gases through membranes can be defined as:

$$1\ GPU = \frac{10^{-6}\ cm^3\ (STP)}{cm^2 \times sec. \times cm\ Hg}$$

wherein $cm^3$ (STP)/sec is the flux (flow rate) in units volume per seconds of permeated gas at standard temperatures and pressure, $cm^2$ is the surface area of the membrane available for permeation, and cm Hg is the partial-pressure difference of a given gas across the membrane (or driving force).

The $O_2$ permeance and $O_2/N_2$ selectivity are used to quantify the membrane's morphology change from contact with solvent in the following manner: As with most asymmetric membranes, the thickness of the thin skin of the membrane cannot be accurately measured. The resistance to gas flow in the membrane is therefore used, it is proportional to the skin thickness if it is assumed most of the resistance to gas flow in the membrane is in the skin. Effective skin thickness (EST) is in essence a direct measure of the resistance to flow. EST is defined as follows:

$$EST = [1 + (1 - S_m/S_p)/(S_m/0.94 - 1)] \text{ Permeability}(O_2)/\text{Permeance}(O_2)$$

where:
  EST=effective skin thickness, in Ångström
  $S_m = O_2/N_2$ selectivity of the membrane
  $S_p = O_2/N_2$ permselectivity of the polymer
  Permeance ($O_2$) in GPU
  Permeability ($O_2$) in $10^{-10}$ $cm^3$ (STP) $cm/cm^2$ sec cm Hg (Barrers)

The increase in EST following fluorocarbon treatment is a measure of morphology change resulting in increased skin thickness and increased resistance to gas flow.

The invention as described herein is useful for the separation of, for example, oxygen from nitrogen or air; hydrogen from at least one of carbon monoxide, carbon dioxide, helium, nitrogen, oxygen, argon, hydrogen sulfide, nitrous oxide, ammonia, and hydrocarbon of 1 to about 5 carbon atoms, especially methane, ethane and ethylene; ammonia from at least one of hydrogen, nitrogen, argon, and hydrocarbon of 1 to about 5 carbon atoms; e.g., methane; carbon dioxide from at least one of carbon monoxide, nitrogen and hydrocarbon of 1 to about 5 carbon atoms; e.g., methane; hydrogen sulfide from hydrocarbon of 1 to about 5 carbon atoms; for instance, methane, ethane, or ethylene; and carbon monoxide from at least one of hydrogen, helium, nitrogen, and hydrocarbon of 1 to about 5 carbon atoms. It is emphasized that the invention is also useful for liquid separations and is not restricted to these particular separation applications of gases nor the specific membranes in the examples.

EXAMPLES

Example 1

An asymmetric hollow-fiber membrane was formed from a polyimide, MATRIMID® 5218 (commercially available from Ciba Geigy Corp.). A spinning solution was prepared with 27%±1% wt. MATRIMID® and 5.4% wt. THERMOGUARD® 230 (commercially available from Atochem Corp.) in N-methyl-2-pyrrolidone.

The solution was extruded through a hollow-fiber spinneret with fiber channel dimensions of outer diameter 22 mils (0.056 cm) and inner diameter equal to 10 mils (0.025 cm) at a solution flowrates of 1.63 $cm^3$/min. A solution of 90% N-methyl-2-pyrrolidone in water was injected into the bore of the nascent fiber at a rate of 0.55 $cm^3$/min. The spun fiber was passed through an air gap of 2.5 to 5 cm at room temperature into a water coagulant bath maintained at 27° C. and collected at a take-up speed of 80 m/min.

The water-wet fiber was solvent-exchanged and dried as taught in U.S. Pat. Nos. 4,080,744; 4,120,098; and EPO No. 219,878. This specifically involved the sequential replacement of water with methanol, the replacement of methanol with hexane, and drying in a sweep of hot nitrogen.

The fiber was cut and formed into 600-fiber bundles approximately one meter long. The bundles were built into small test permeators by potting the open ends of the fiber in an epoxy resin within a stainless steel tube. The permeator design was suited for both tube-feed and shell-feed counter current gas separation, as well as single-gas permeation testing.

The gas-separation performance of the hollow-fiber membrane was measured—before and after membrane treatment with fluorocarbon—in tube-feed air separation, generally producing 90 to 99.5% inerts ($N_2$+Ar) from 100 psig compressed air, and measuring the flowrate and purity of the permeate and nonpermeate streams. The $O_2$ permeance and the $O_2/N_2$ selectivity were calculated from the measured air-separation data.

After gas-separation tests on the untreated membrane, the membrane was treated with FREON® E1. This was accomplished by contacting the shell side of the membrane with FREON® E1 for 15 minutes, in the test permeator. The permeator was then dried and retested. The membrane exhibited the following permeation properties and EST before and after the treatment:

TABLE I

| | $O_2$ Permeance | $O_2/N_2$ | EST |
|---|---|---|---|
| Before contact | 89 GPU | 1.6 | 310 angstroms |
| After contact | 64 GPU | 2.3 | 300 angstroms |

For comparison, fifteen minutes contact of the membrane with hexane in similar conditions caused 60 to 70% loss Of $O_2$ flux.

Example 2

Two polymer solutions were prepared with MATRIMID® 5218 and ULTEM® 1000 (commercially available from General Electric Corp.) as described in U.S. Pat. No. 5,085, 676. The first solution was prepared with 25.5%±1% wt solids content of MATRIMID® in N-methyl-2-pyrrolidone. The second solution was prepared with 31±1% wt solids content of 9:1 ULTEM®/MATRIMID® in N-methyl-2-pyrrolidone.

The above solutions were coextruded through a composite hollow-fiber spinneret with fiber channel dimensions of outer diameter 22 mils (0.056 cm) and inner diameter equal to 10 mils (0.025 cm) at solution flowrates of 1.53 $cm^3$/min (first solution) and 0.2 $cm^3$/min (second solution). A solution of 90% N-methyl-2-pyrrolidone in water was injected into the fiber bore at a rate of 0.81 $cm^3$/min. The spun fiber passed through an air gap of 2.5 to 5 cm at room temperature into a water coagulant bath maintained at 27° C. The fiber was collected at a take-up speed of 90 m/min.

The water-wet fiber was solvent-exchanged and dried as taught in U.S. Pat. Nos. 4,080,744; 4,120,098; and EPO No. 219,878. This specifically involved the sequential replacement of water with methanol, the replacement of methanol with hexane, and drying in a sweep of hot nitrogen.

The fiber was cut and formed into 600-fiber bundles approximately one meter long. These were built into small test permeators by potting the open ends of the fiber in an epoxy resin within a stainless steel tube.

The shell-side of the fiber was contacted with FREON® E1 for 15 minutes. The membrane exhibited the following permeation properties before and after the treatment:

TABLE II

|  | $O_2$ Permeance | $O_2/N_2$ | EST |
|---|---|---|---|
| Before contact | 137 GPU | 1.63 | 280 angstroms |
| After contact | 74 GPU | 4.84 | 280 angstroms |
| Before contact | 125 GPU | 2.30 | 220 angstroms |
| After contact | 64 GPU | 5.88 | 300 angstroms |

Example 3

Samples of hollow-fiber membrane of Example 1 were tested for gas permeation properties and then contacted with a solution of fluorinated solvent identified in Table III and a caulking/coating agent identified in Table III for the contact time specified in Table III. The performance of the membranes before and after the treatment is reported in Table III.

The treatment effectively sealed the membrane skin, yielding membrane with high $O_2/N_2$ selectivity for application in air separation. More importantly, the treatment caused only minimal solvent-induced morphology change, as clearly shown by the absence of large increase in the effective skin thickness.

TABLE III

Permeation data with hollow-fiber membrane treated with sealing materials dissolved in fluorocarbon solvents.

| Untreated | | | Treatment | | | Treated | | |
|---|---|---|---|---|---|---|---|---|
| $O_2$ Permeance | $O_2/N_2$ | EST | Fluorocarbon Solvent | Sealing Material | Contact Time | $O_2$ Permeance | $O_2/N_2$ | EST |
| 83 GPU | 1.66 | 320Å | FREON® E1 | 1.0% Teflon® AF | 120 min | 34.8 GPU | 6.50 | 380Å |
| 85 GPU | 1.80 | 280Å | FREON® E1 | 1.0% Teflon® AF | 15 min | 43.3 GPU | 6.80 | 303Å |
| 80 GPU | 1.66 | 325Å | FREON® E1 | 1.0% Teflon® AF | 15 min | 36.4 GPU | 6.65 | 362Å |
| 83 GPU | 1.76 | 290Å | FREON® E1 | 1.0% Teflon® AF | 3 min | 29.7 GPU | 5.58 | 460Å |
| 94 GPU | 1.67 | 275Å | Perfluoro tetrahydrofuran | 1.0% Teflon® AF | 15 min | 36.6 GPU | 6.33 | 360Å |
| 91 GPU | 1.65 | 290Å | Perfluorohexane | 1.0% Teflon® AF | 15 min | 28.7 GPU | 5.92 | 350Å |
| — | — |  | FREON® E1 | 0.2% Dioctyl phthalate | 15 min | 22.0 GPU | 6.41 | 600Å |
| 77 GPU | 1.85 | 300Å | FREON® E1 | Dilute Dioctyl phthalate | 15 min | 26.3 GPU | 6.73 | 500Å |
| 74 GPU | 2.06 | 280Å | FREON® E1 | Dilute Dioctyl phthalate | 15 min | 37.3 GPU | 6/16 | 360Å |
| 69 GPU | 2.5 | 260Å | FREON® E1 | 0.5% poly(fluoro-alkyl methacrylate) | 15 min | 24.0 GPU | 7.05 | 540Å |
| 71 GPU | 2.1 | 270Å | FREON® E1 | 0.05% poly(fluoro-alkyl methacrylate) | 15 min | 29.0 GPU | 7.15 | 450Å |

All data derived from $N_2$-enrichment tests, at 21–24° C., 100 psig, and 95% inerts.

Example 4

Samples of hollow-fiber membrane of Example 2 were contacted with a solution of the fluorinated solvent specified in Table IV and a caulking/coating agent specified in Table IV for the contact time specified in Table IV. The gas separation performance of the membranes before and after the treatment is reported in Table IV.

The treatment effectively sealed the membrane skin, yielding membrane with high $O_2/N_2$ selectivity. More importantly, the treatment caused only minimal solvent-induced morphology change or damage, as clearly shown by the absence of large increase in the effective skin thickness.

Glossary

TEFLON® AF is dipolymer of perfluoro-2,2-dimethyl-1,3-dioxole and tetrafluoroethylene commercially available from E.I. du Pont de Nemours and Company.

VERTREL® 245 is 1,1,2,2,3,4-hexafluoro-3,4-bis(trifluoromethyl cyclobutane) commercially available from E.I. du Pont de Nemours and Company.

TABLE IV

Permeation data with hollow-fiber membrane treated with sealing materials dissolved in fluorocarbon solvents.

| Untreated | | | Treatment | | | Treated | | |
|---|---|---|---|---|---|---|---|---|
| $O_2$ Permeance | $O_2/N_2$ | EST | Fluorocarbon Solvent | Sealing Material | Contact Time | $O_2$ Permeance | $O_2/N_2$ | EST |
| 75 GPU | 4.84 | 270Å | FREON ® E1 | 0.2% Teflon ® AF | 15 min | 67 GPU | 5.92 | 290Å |
| 176 GPU | 1.61 | 225Å | FREON ® E1 | 1% Teflon ® AF | 15 min | 76 GPU | 5.8 | 260Å |
| 249 GPU | 1.35 | 220Å | FREON ® E1 | 1% Teflon ® AF | 15 min | 66 GPU | 6.25 | 290Å |
| 142 GPU | 1.85 | 235Å | FREON ® E1 | 1% Teflon ® AF | 15 min | 58 GPU | 6.5 | 330Å |
| 160 GPU | 1.73 | 225Å | FREON ® E1 | 1% Teflon ® AF | 15 min | 57 GPU | 6.41 | 340Å |
| 64 GPU | 2.5 | 305Å | FREON ® E1 | 1% Teflon ® AF | 15 min | 57 GPU | 6.15 | 340Å |
| 119 GPU | 2.5 | 220Å | VERTREL ® 245 | 1% Teflon ® AF | 15 min | 51 GPU | 6.4 | 380Å |
| 176 GPU | 2.0 | 175Å | FREON ® E2 | 1% Teflon ® AF | 15 min | 53 GPU | 5.8 | 270Å |
| 85 GPU | 3.2 | 275Å | FREON ® E2 | 1% Teflon ® AF | 15 min | 42 GPU | 6.5 | 460Å |
| 120 GPU | 2.20 | 240Å | FREON ® E1 | 0.05% poly(fluoro-alkyl methacrylate) | 15 min | 53 GPU | 6.50 | 360Å |
| 180 GPU | 1.50 | 250Å | FREON ® E1 | 0.02% poly(fluoro-alkyl methacrylate) | 15 min | 50 GPU | 5.90 | 390Å |
| 134 GPU | 2.15 | 217Å | FREON ® E1 | 0.2% Dioctyl phthalate | 15 min | 57 GPU | 6.49 | 340Å |

All data derived from $N_2$-enrichment tests, at 21–24° C., 100 psig, and 95% inerts.

What is claimed is:

1. A process for improving the permselectivity of a polymeric gas separation membrane for at least one gas of a mixture of two or more gases, said process comprising contacting said membrane with a perfluorinated or quasi-perfluorinated solvent at conditions effective to heal defects or imperfections in the membrane, wherein said quasi-perfluorinated solvent is a solvent in which all but one hydrogen atom on each carbon atom has been replaced with fluorine.

2. The process according to claim 1, wherein said perfluorinated or quasi-perfluorinated solvent is mixed with a swelling agent, a caulking agent, or a surfactant.

3. The process according to claim 2, wherein said caulking agent is a polymer of perfluoro-2,2-dimethyl-1,3-dioxole or a copolymer of perfluoro-2,2-dimethyl-1,3-dioxole and at least one of tetrafluoroethylene, perfluoromethyl vinyl ether, vinylidene fluoride, chlorotrifluoroethylene, and perfluoroalkyl methacrylate.

4. The process according to claim 1, wherein said perfluorinated solvent is selected from perfluorinated ethers, perfluorinated alkanes, perfluorinated cycloalkanes, perfluorotrialkylamines, and perfluorinated aromatic compounds.

5. The process according to claim 4, wherein said perfluorinated solvent is 1,1,2,2,3,4-hexafluoro-3,4-bis(trifluoromethyl)cyclobutane; 1,1,2,3,3,4-hexafluoro-2,4-bis(trifluoromethyl)cyclobutane; perfluorotetrahydrofuran, perfluorobutyltetrahydrofuran; perfluoro n-hexane; or perfluoro n-heptane.

6. The process according to claim 1, wherein the membrane is hollow fiber.

7. A process for improving the permselectivity of a polymeric gas separation membrane for at least one gas of a mixture of two or more gases, said process comprising contacting said membrane with a solution which consists essentially of a perfluorinated or quasi-perfluorinated solvent at conditions effective to heal defects or imperfections in the membrane, wherein said quasi-perfluorinated solvent is a solvent in which all but one hydrogen atom on each carbon atom has been replaced with fluorine.

* * * * *